(12) United States Patent
Meng

(10) Patent No.: US 10,492,253 B2
(45) Date of Patent: Nov. 26, 2019

(54) BACKLIGHT DRIVING CIRCUITS

(71) Applicants: BOE Technology Group Co., Ltd., Beijing (CN); Beijing BOE Optoelectronics Technology Co., Ltd., Beijing (CN)

(72) Inventor: Zhaohui Meng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 2 days.

(21) Appl. No.: 15/646,277

(22) Filed: Jul. 11, 2017

(65) Prior Publication Data
US 2018/0063908 A1    Mar. 1, 2018

(30) Foreign Application Priority Data

Aug. 30, 2016    (CN) .......................... 2016 1 0793319

(51) Int. Cl.
*G09G 3/34*    (2006.01)
*H05B 33/08*    (2006.01)
*G02F 1/1335*    (2006.01)

(52) U.S. Cl.
CPC ... *H05B 33/0815* (2013.01); *G02F 1/133603* (2013.01); *G09G 3/34* (2013.01);
(Continued)

(58) Field of Classification Search
CPC ............ H05B 33/0815; H05B 33/0827; G02F 1/133603; G09G 3/34; G09G 3/3406; G09G 2320/041
See application file for complete search history.

(56) References Cited

U.S. PATENT DOCUMENTS

| 2009/0079359 | A1* | 3/2009 | Shteynberg | ........ H05B 33/0818 315/291 |
| 2009/0230883 | A1* | 9/2009 | Haug | .................... H05B 33/083 315/297 |

(Continued)

FOREIGN PATENT DOCUMENTS

| CN | 101806977 A | 8/2010 |
| CN | 103500557 A | 1/2014 |

(Continued)

OTHER PUBLICATIONS

First Office Action, including Search Report, for Chinese Patent Application No. 201610793319.3, dated Mar. 30, 2018, 11 pages.

*Primary Examiner* — Parul H Gupta
(74) *Attorney, Agent, or Firm* — Westman, Champlin & Koehler, P.A.

(57) ABSTRACT

The present disclosure relates to a backlight driving circuit, comprising: a voltage supply configured to supply a first driving voltage; and a voltage regulator configured to receive the first driving voltage supplied by the voltage supply, output the first driving voltage to a light emitting element when an ambient temperature of the light emitting element is lower than a preset threshold, and output a second driving voltage less than the first driving voltage to the light emitting element when the ambient temperature of the light emitting element is higher than the preset threshold.

12 Claims, 3 Drawing Sheets

(52) U.S. Cl.
CPC ....... *G09G 3/3406* (2013.01); *H05B 33/0827* (2013.01); *H05B 33/0854* (2013.01); *G09G 2320/041* (2013.01)

(56) References Cited

U.S. PATENT DOCUMENTS

| | | | |
|---|---|---|---|
| 2011/0273102 A1* | 11/2011 | van de Ven | ........ H05B 33/0809 315/193 |
| 2015/0223304 A1 | 8/2015 | Li | |
| 2016/0360582 A1* | 12/2016 | Kato | ................. H05B 33/0815 |

FOREIGN PATENT DOCUMENTS

| | | |
|---|---|---|
| CN | 104091570 A | 10/2014 |
| EP | 1 988 536 A1 | 11/2008 |
| JP | 2013-161059 A | 8/2013 |

\* cited by examiner

BACKLIGHT DRIVING CIRCUITS

CROSS-REFERENCE TO RELATED APPLICATION(S)

This application claims priority to the Chinese Patent Application No. 201610793319.3, filed on Aug. 30, 2016, entitled "BACKLIGHT DRIVING CIRCUITS," which is incorporated herein by reference in its entirety.

TECHNICAL FIELD

The present disclosure relates to the field of backlighting technology, and more particularly, to backlight driving circuits.

BACKGROUND

Backlight is an important constituent part of a liquid crystal module. A main operation module of a backlight is a Light Emitting Diode (LED) driver and an LED light. Therefore, an operation voltage and operation current of the LED light are major factors which influence power consumption of the backlight.

A calculation formula of the power consumption of the backlight is: power consumption=voltage×current. The LED light is a physical element with PN junction characteristics, and as operation time elapses, current flowing through the LED light may increase with temperature increases at a constant voltage, and thus the power consumption also increases therewith.

SUMMARY

According to an aspect of the present disclosure, there is provided a backlight driving circuit, comprising: a voltage supply configured to supply a first driving voltage; and a voltage regulator configured to receive the first driving voltage supplied by the voltage supply, output the first driving voltage to a light emitting element when an ambient temperature of the light emitting element is lower than a preset threshold, and output a second driving voltage less than the first driving voltage to the light emitting element when the ambient temperature of the light emitting element is higher than the preset threshold.

In an embodiment of the present disclosure, the voltage regulator comprises a control unit and an output unit, wherein the control unit is configured to control an output of the output unit according to the ambient temperature of the light emitting element, and the output unit is configured to output the first driving voltage or the second driving voltage under the control of the control unit.

In an embodiment of the present disclosure, the output unit comprises a first output module and a second output module, wherein the first output module is configured to output the first driving voltage when the ambient temperature of the light emitting element is lower than the preset threshold, and the second output module is configured to output the second driving voltage when the ambient temperature of the light emitting element is higher than the preset threshold.

In an embodiment of the present disclosure, the control unit comprises a temperature detection module and a comparison module, wherein the temperature detection module is configured to detect the ambient temperature of the light emitting element and input the detected temperature into the comparison module, and the comparison module is configured to compare the detected temperature with the preset threshold, select the first output module to output the first driving voltage when the detected temperature is lower than the preset threshold, and select the second output module to output the second driving voltage when the detected temperature is higher than the preset threshold.

In an embodiment of the present disclosure, the control unit comprises a reference resistor, a thermistor and a comparator, wherein the thermistor has one end connected to the voltage supply and the other end connected to one input end of the comparator, the reference resistor has one end connected to the voltage supply and the other end connected to the other input end of the comparator, the comparator has an output end connected to the output unit, and a resistance value of the reference resistor is a resistance value of the thermistor when the ambient temperature of the light emitting element is the preset threshold.

In an embodiment of the present disclosure, in a case that the thermistor is a positive temperature coefficient thermistor, the first output module is selected by an output signal from the comparator to output the first driving voltage when the resistance value of the thermistor is lower than the resistance value of the reference resistor, and the second output module is selected by the output signal from the comparator to output the second driving voltage when the resistance value of the thermistor is higher than the resistance value of the reference resistor.

In an embodiment of the present disclosure, in a case that the thermistor is a negative temperature coefficient thermistor, the first output module is selected by the output signal from the comparator to output the first driving voltage when the resistance value of the thermistor is higher than the resistance value of the reference resistor, and the second output module is selected by the output signal from the comparator to output the second driving voltage when the resistance value of the thermistor is lower than the resistance value of the reference resistor.

In an embodiment of the present disclosure, the second output module constitutes a voltage dividing circuit of the first output module.

In an embodiment of the present disclosure, the first output module comprises a first switch element, and the second output module comprises a first resistor and a second resistor which are connected in series and a second switch element.

According to another aspect of the present disclosure, there is provided a backlight apparatus, comprising: the backlight driving circuit according to the embodiments of the present disclosure; and a light emitting element.

In an embodiment of the present disclosure, the voltage regulator comprises a control unit and an output unit, wherein the control unit is configured to control an output of the output unit according to the ambient temperature of the light emitting element, and the output unit is configured to output the first driving voltage or the second driving voltage under the control of the control unit.

In an embodiment of the present disclosure, the output unit comprises a first output module and a second output module, wherein the first output module is configured to output the first driving voltage when the ambient temperature of the light emitting element is lower than the preset threshold, and the second output module is configured to output the second driving voltage when the ambient temperature of the light emitting element is higher than the preset threshold.

In an embodiment of the present disclosure, the control unit comprises a temperature detection module and a comparison module, wherein the temperature detection module is configured to detect the ambient temperature of the light emitting element and input the detected temperature into the comparison module, and the comparison module is configured to compare the detected temperature with the preset threshold, select the first output module to output the first driving voltage when the detected temperature is lower than the preset threshold, and select the second output module to output the second driving voltage when the detected temperature is higher than the preset threshold.

In an embodiment of the present disclosure, the control unit comprises a reference resistor, a thermistor and a comparator, wherein the thermistor has one end connected to the voltage supply and the other end connected to one input end of the comparator, the reference resistor has one end connected to the voltage supply and the other end connected to the other input end of the comparator, the comparator has an output end connected to the output unit, and a resistance value of the reference resistor is a resistance value of the thermistor when the ambient temperature of the light emitting element is the preset threshold.

In an embodiment of the present disclosure, in a case that the thermistor is a positive temperature coefficient thermistor, the first output module is selected by an output signal from the comparator to output the first driving voltage when the resistance value of the thermistor is lower than the resistance value of the reference resistor, and the second output module is selected by the output signal from the comparator to output the second driving voltage when the resistance value of the thermistor is higher than the resistance value of the reference resistor.

In an embodiment of the present disclosure, in a case that the thermistor is a negative temperature coefficient thermistor, the first output module is selected by the output signal from the comparator to output the first driving voltage when the resistance value of the thermistor is higher than the resistance value of the reference resistor, and the second output module is selected by the output signal from the comparator to output the second driving voltage when the resistance value of the thermistor is lower than the resistance value of the reference resistor.

In an embodiment of the present disclosure, the second output module constitutes a voltage dividing circuit of the first output module.

In an embodiment of the present disclosure, the first output module comprises a first switch element, and the second output module comprises a first resistor and a second resistor which are connected in series and a second switch element.

BRIEF DESCRIPTION OF THE DRAWINGS

In order to more clearly illustrate the technical solutions according to the embodiments of the present disclosure, the accompanying drawings of the exemplary embodiments will be briefly described below. It is obvious that the accompanying drawings in the following description are exemplary and illustrative only and are not intended to limit the present disclosure in any way. Other accompanying drawings can further be obtained by those of ordinary skill in the art from these accompanying drawings. Various aspects and their further purposes and advantages of the embodiments of the present disclosure will be better understood with reference to the following detailed description of illustrative embodiments when read in conjunction with the accompanying drawings in which.

DETAILED DESCRIPTION

In order to make the purposes, technical solutions and advantages of the embodiments of the present disclosure more clear, the embodiments of the present disclosure will be described in detail below with reference to the accompanying drawings. Obviously, the described embodiments are only a part of the embodiments of the present disclosure, instead of all the embodiments.

Throughout this specification, reference to features, advantages, or similar expressions is not intended to mean that all features and advantages which may be practiced with the present disclosure should be or are within any single embodiment of the present disclosure. Rather, it is to be understood that expressions related to features and advantages mean that the specific features, advantages or characteristics described in connection with the embodiments are included in at least one embodiment of the present disclosure. Thus, throughout the specification, discussions of features and advantages as well as similar expressions may refer to the same embodiment, but not necessarily to the same embodiment. In addition, the described features, advantages and characteristics of the present disclosure may be incorporated in one or more embodiments in any suitable manner. Those skilled in the relevant art will recognize that the present disclosure may be practiced without one or more specific features or advantages of a particular embodiment. In other examples, additional features and advantages may be implemented in certain embodiments, but are not necessarily present in all the embodiments of the present disclosure.

<Temperature Characteristics of LEDs>

LED is a semiconductor diode which has a volt-ampere characteristic as with all diodes. Further, as with all semiconductor diodes, there is a temperature characteristic for the volt-ampere characteristic.

Figure 1:
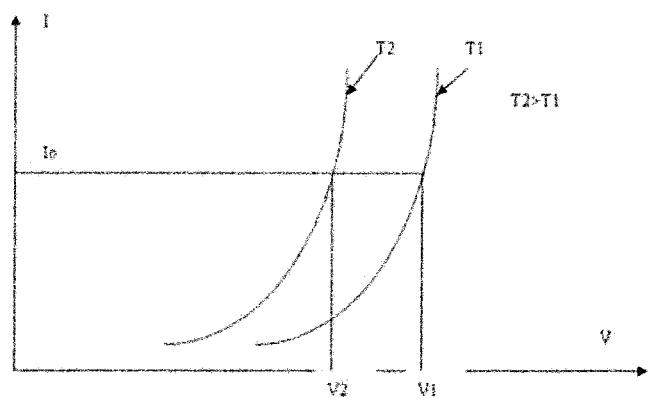
FIG. 1 illustrates a diagram of a temperature-voltage-current characteristic of an LED.

A diode is a PN junction formed by a P-type semiconductor and an N-type semiconductor, a space charge layer is formed at two sides of an interface of the PN junction, and a built-in electric field is established. When there is no applied voltage, as diffusion current caused by a concentration difference between carriers at the two sides of the PN junction is equal to drift current caused by the built-in electric field, the diffusion current and the drift current are in an electric equilibrium state. When there is an applied positive voltage bias, the diffusion current of the carriers increases due to mutual suppression between the external electric field and the built-in electric field, which causes forward current. Holes injected from a P region into an N region and electrons injected from the N region into the P region are recombined with electrons in the N region and holes in the P region respectively within several micrometers from the PN junction to produce spontaneous radio fluorescence. Its characteristic is that when a temperature rises, the volt-ampere characteristic moves to the left. FIG. 1 illustrates a schematic diagram of a temperature-voltage-current characteristic (i.e., a temperature characteristic for the volt-ampere characteristic) of an LED.

Assuming that the LED is powered with constant current lo, when a junction temperature is T1, a voltage is V1, and when the junction temperature rises to T2, the entire volt-ampere characteristic moves to the left, the current lo does not change, and the voltage becomes V2 where V2<V1.

The embodiments of the present disclosure provide a backlight driving circuit based on the temperature characteristic for the volt-ampere characteristic of the LED described above.

Figure 2:
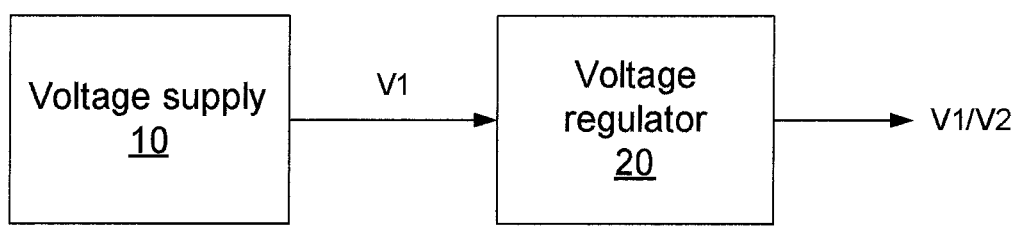
FIG. 2 illustrates a schematic block diagram of a first example of a backlight driving circuit according to an embodiment of the present disclosure.

FIG. 2 illustrates a schematic block diagram of a first example of a backlight driving circuit according to an embodiment of the present disclosure. As shown in FIG. 2, the backlight driving circuit may comprise a voltage supply 10 and a voltage regulator 20. The voltage supply 10 may supply a first driving voltage V1. The voltage supply 10 is connected to the voltage regulator 20. The voltage regulator 20 outputs a first driving voltage V1 or a second driving voltage V2, wherein the second driving voltage V2 is less than the first driving voltage V1.

Specifically, the voltage regulator 20 may output the first driving voltage V1 to a light emitting element when an ambient temperature of the light emitting element is lower than a preset threshold, and output the second driving voltage V2 less than the first driving voltage V1 to the light emitting element when the ambient temperature of the light emitting element is higher than the preset threshold.

Figure 3:
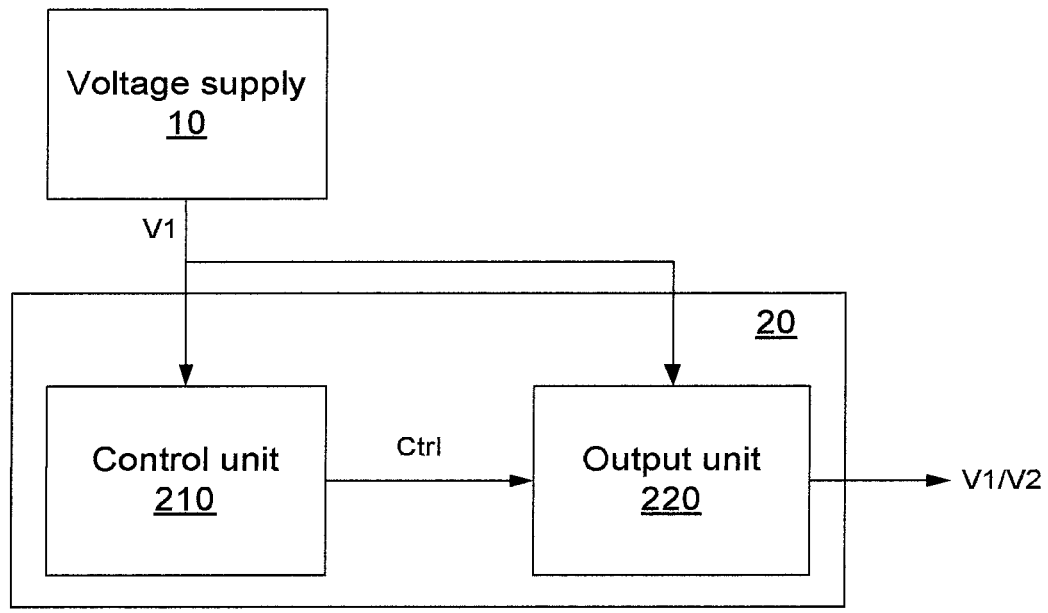
FIG. 3 illustrates a schematic block diagram of a second example of a backlight driving circuit according to an embodiment of the present disclosure.

FIG. 3 illustrates a schematic block diagram of a second example of a backlight driving circuit according to an embodiment of the present disclosure. As shown in FIG. 3, the backlight driving circuit may comprise a voltage supply 10 and a voltage regulator 20. The voltage supply 10 may supply a first driving voltage V1. The voltage regulator 20 may comprise a control unit 210 and an output unit 220. The voltage supply unit 10 is connected to the control unit 210 and the output unit 220 respectively. The control unit 210 is connected to the output unit 220. The control unit 210 outputs a control signal Ctrl to the output unit 220 according to an ambient temperature of a light emitting element, to control the output unit 220 to output a corresponding driving voltage, that is, the first driving voltage V1 or a second driving voltage V2.

Specifically, when the ambient temperature of the light emitting element is lower than a preset threshold, that is, before a temperature of the light emitting element (which is approximate to the ambient temperature of the light emitting element) rises to a predetermined operating temperature (slightly above the preset threshold), the control signal Ctrl output by the control unit 210 controls the output unit 220 to output the first driving voltage V1. When the ambient temperature of the light emitting element is higher than the preset threshold, that is, after the temperature of the light emitting element rises to the predetermined operating temperature, the control signal Ctrl output by the control unit 210 controls the output unit 220 to output the second driving voltage V2 less than the first driving voltage V1.

According to a temperature-voltage-current characteristic of the light emitting element, while driving current of the light emitting element is ensured, a driving voltage is reduced in a case that the temperature of the light emitting element rises to the predetermined operating temperature, so as to reduce the power consumption.

Figure 4:
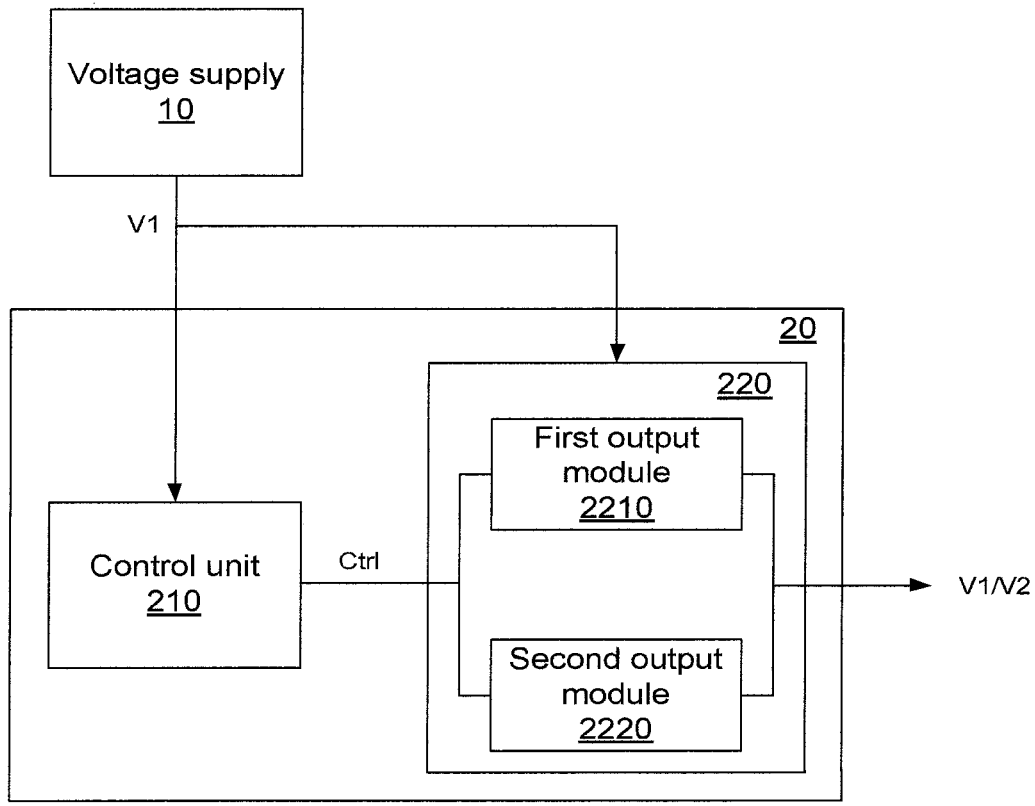
FIG. 4 illustrates a schematic block diagram of a third example of a backlight driving circuit according to an embodiment of the present disclosure.

FIG. 4 illustrates a schematic block diagram of a third example of a backlight driving circuit according to an embodiment of the present disclosure. As shown in FIG. 4, the backlight driving circuit may comprise a voltage supply 10 and a voltage regulator 20. The voltage supply 10 may supply a first driving voltage V1. The voltage regulator 20 may comprise a control unit 210 and an output unit 220. The voltage supply 10 is connected to the control unit 210 and the output unit 220 respectively. The control unit 210 is connected to the output unit 220. The output unit 220 may comprise a first output module 2210 and a second output module 2220. The control unit 210 outputs a control signal Ctrl to the output unit 220 according to an ambient temperature of a light emitting element to select the first output module 2210 to output the first driving voltage V1 or select the second output module 2220 to output a second driving voltage V2 less than the first driving voltage V1.

Specifically, when the ambient temperature of the light emitting element is lower than the preset threshold, that is, before a temperature of the light emitting element (which is approximate to the ambient temperature of the light emitting element) rises to the predetermined operating temperature (slightly above the preset threshold), the first output module 2210 is selected by the control signal Ctrl output by the control unit 210 to output the first driving voltage V1. When the ambient temperature of the light emitting element is higher than the preset threshold, that is, after the temperature of the light emitting element rises to the predetermined operating temperature, the second output module 2220 is selected by the control signal Ctrl output by the control unit 210 to output the second driving voltage V2 less than the first driving voltage V1. In this way, in a case that the temperature of the light emitting element rises to the predetermined operating temperature, a driving voltage is reduced, so as to reduce the power consumption.

Figure 5:
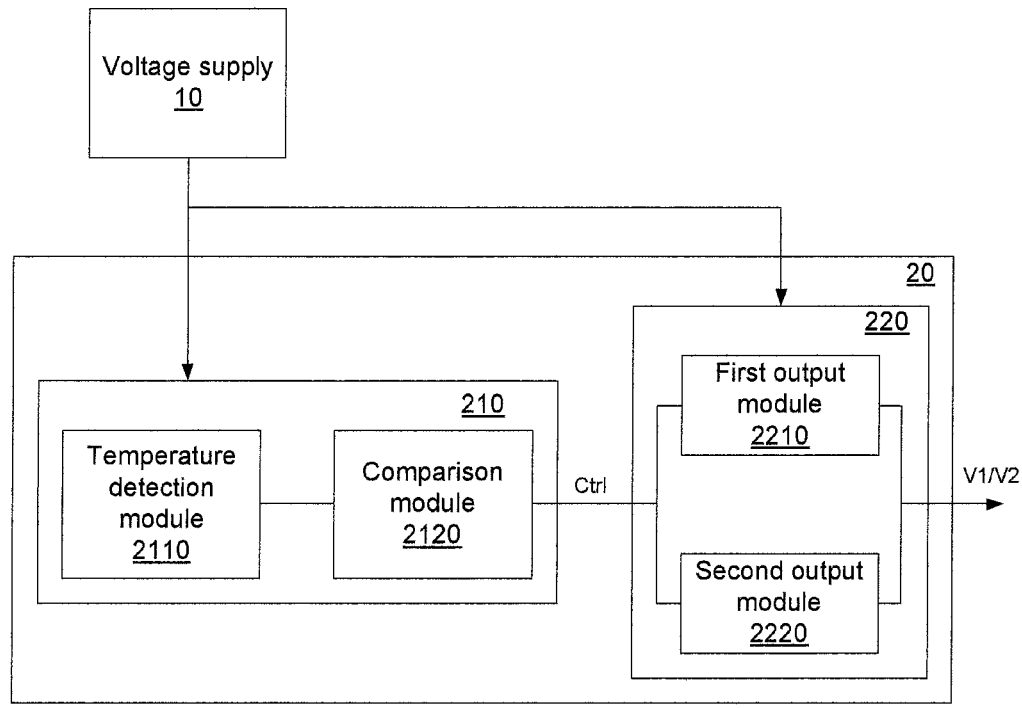
FIG. 5 illustrates a schematic block diagram of a fourth example of a backlight driving circuit according to an embodiment of the present disclosure.

FIG. 5 illustrates a schematic block diagram of a fourth example of a backlight driving circuit according to an embodiment of the present disclosure. As shown in FIG. 5, the backlight driving circuit may comprise a voltage supply 10 and a voltage regulator 20. The voltage supply 10 may supply a first driving voltage V1. The voltage regulator 20 may comprise a control unit 210 and an output unit 220. The voltage supply 10 is connected to the control unit 210 and the output unit 220 respectively. The control unit 210 is connected to the output unit 220. The control unit 210 may comprise a temperature detection module 2110 and a comparison module 2120. The output unit 220 may comprise a first output module 2210 and a second output module 2220. The comparison module 2120 outputs a control signal Ctrl to the output unit 220 according to comparison of an ambient temperature of a light emitting element detected by the temperature detection module 2110 with a preset threshold to select the first output module 2210 to output the first driving voltage V1 or select the second output module 2220 to output a second driving voltage V2 less than the first driving voltage V1.

Specifically, the temperature detection module 2110, such as a temperature sensor, detects the ambient temperature of the light emitting element and inputs the detected temperature into the comparison module 2120. The comparison module 2120 compares the detected temperature with the preset threshold, which may be pre-stored in the comparison module 2120 or may be input from the outside of the comparison module 2120. When the detected temperature is lower than the preset threshold, the first output module 2210 is selected by the control signal Ctrl output by the comparison module 2120 to output the first driving voltage V1. When the detected temperature is higher than the preset threshold, the second output module 2220 is selected by the control signal Ctrl output by the control unit 210 to output the second driving voltage V2 less than the first driving voltage V1. In this way, in a case that a temperature of the light emitting element rises to a predetermined operating temperature, a driving voltage is reduced, so as to reduce the power consumption.

Alternatively, the ambient temperature of the light emitting element may also be monitored by setting a thermistor and monitoring a change in a resistance value of the thermistor, so that the control unit 210 controls the output unit 220 to output a corresponding driving voltage, i.e., the first driving voltage V1 or the second driving voltage V2, according to the ambient temperature of the light emitting element.

For example, the control unit 210 may comprise a reference resistor, a thermistor and a comparator. The thermistor has one end connected to the voltage supply 10 and the other end connected to one input end of the comparator, the reference resistor has one end connected to the voltage supply 10 and the other end connected to the other input end of the comparator, and the comparator has an output end connected to the output unit. Thereby, the first output module 2210 is selected by an output signal from the comparator to output the first driving voltage V1 or the second output module 2220 is selected by the output signal from the comparator to output the second driving voltage V2 less than the first driving voltage V1. A resistance value of the thermistor changes with a temperature, and a resistance value of the reference resistor is a resistance value of the thermistor when the ambient temperature of the light emitting element is the preset threshold.

In a case that the resistance value of the thermistor increases with the temperature increases (that is, when a positive temperature coefficient thermistor is used), when the resistance value of the thermistor is lower than the resistance value of the reference resistor (that is, when the ambient temperature of the light emitting element is lower than the preset threshold), the first output module 2210 is selected by the output signal from the comparator (i.e., the control signal Ctrl of the control unit 210) to output the first driving voltage V1, and when the resistance value of the thermistor is higher than the resistance value of the reference resistor (that is, when the ambient temperature of the light emitting element is higher than the preset threshold), the second output module 2220 is selected by the output signal from the comparator (i.e., the control signal Ctrl of the control unit 210) to output the second driving voltage V2 less than the first driving voltage V1.

On the contrary, in a case that the resistance value of the thermistor decreases with the temperature increases (that is, when a negative temperature coefficient thermistor is used), when the resistance value of the thermistor is higher than the resistance value of the reference resistor (that is, when the ambient temperature of the light emitting element is lower than the preset threshold), the first output module 2210 is selected by the output signal from the comparator (i.e., the control signal Ctrl of the control unit 210) to output the first driving voltage V1, and when the resistance value of the thermistor is lower than the resistance value of the reference resistor, the second output module 2220 is selected by the output signal from the comparator to output the second driving voltage V2 less than the first driving voltage V1.

As described above, the second driving voltage V2 output by the second output module 2220 is less than the first driving voltage V1 output by the first output module 2210, and therefore, for example, the second output module 2220 may constitute a voltage dividing circuit of the first output module 2210.

The voltage dividing circuit may supply a lower driving voltage, thereby reducing the power consumption of the backlight.

For example, the first output module 2210 may comprise a first switch element, and the second output module 2220 comprises a first resistor and a second resistor which are connected in series and a second switch element.

The switch elements are, for example, transistors, field effect transistors, etc.

Figure 6:
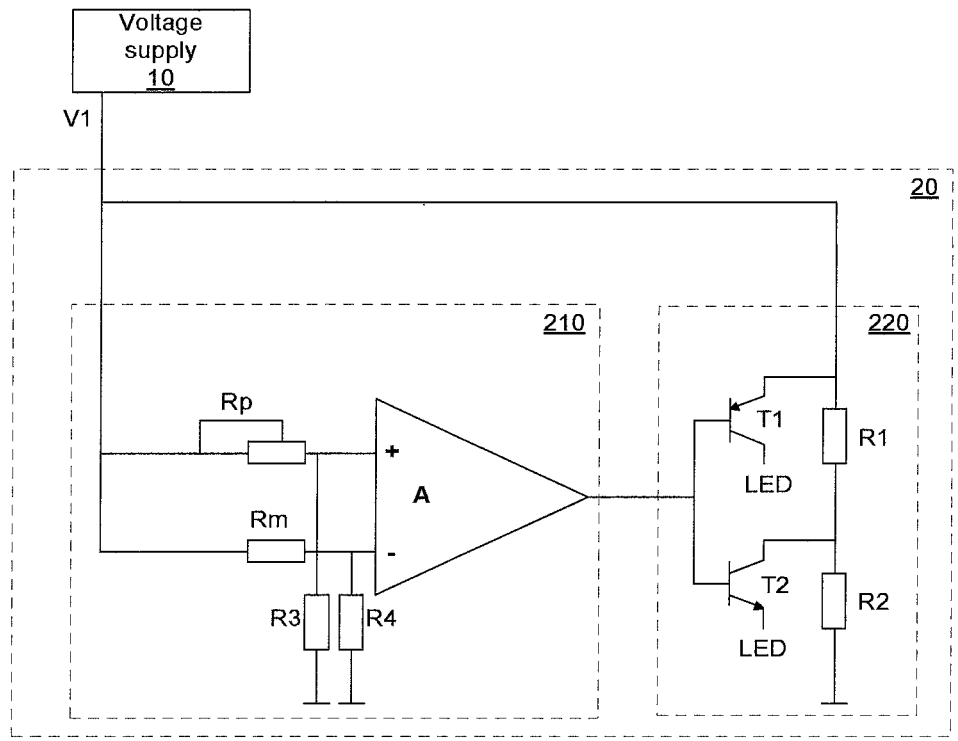
FIG. 6 illustrates a schematic circuit diagram of a fifth example of a backlight driving circuit according to an embodiment of the present disclosure.

In order to facilitate understanding of the present embodiment, FIG. 6 illustrates a schematic circuit diagram of a fifth example of a backlight driving circuit according to an embodiment of the present disclosure. However, the present embodiment is not limited thereto.

As shown in FIG. 6, the backlight driving circuit may comprise a voltage supply 10 and a voltage regulator 20. The voltage supply 10 may supply a first driving voltage V1 to the voltage regulator 20. The voltage regulator 20 may comprise a control unit 210 and an output unit 220.

The control unit 210 comprises a reference resistor Rp, a comparator A, a third resistor R3 and a fourth resistor R4.

Specifically, one end of the reference resistor Rp is connected to an output end of the voltage supply 10, i.e., one end of the reference resistor Rp is at a high potential V1, and the other end of the reference resistor Rp is connected to one end of the third resistor R3 and an input end "+" of the comparator A. The other end of the third resistor R3 is grounded.

One end of the thermistor Rm is connected to the output end of the voltage supply 10, i.e., one end of the thermistor Rm is at a high potential V1, and the other end of the thermistor Rm is connected to one end of the fourth resistor R4 and an input end "−" of the comparator A. The other end of the fourth resistor R4 is grounded.

The output unit 220 of the voltage regulator 20 comprises a first output module and a second output module.

The first output module of the output unit 220 comprises a first switch element T1.

The second output module of the output unit 220 comprises a second switch element T2, a first resistor R1 and a second resistor R2, and the second output module constitutes a voltage dividing circuit of the first output module.

Specifically, the first switch element T1 is, for example, a PNP type transistor, an emitter of the first switch element T1 is connected to the output end of the voltage supply 10 and one end of the first resistor R1, i.e., the emitter of the first switch element T1 is at a high potential V1, and a collector of the first switch element T1 is connected to the light emitting element LED.

The second switch element T2 is, for example, an NPN type transistor, a collector of the second switch element T2 is connected to the other end of the first resistor R1 and one end of the second resistor R2, the first resistor R1 and the second resistor R2 are connected in series, the other end of the second resistor R2 is grounded, and an emitter of the second switch element T2 is also connected to the light emitting element LED.

An output end of the comparator A in the control unit 210 of the voltage regulator 20 is connected to bases of the first switch element T1 and the second switch element T2 in the output unit 220 of the voltage regulator 20 respectively.

In the control unit 210 of the voltage regulator 20, the thermistor Rm is, for example, a positive temperature coefficient thermistor, a resistance value of the reference resistor Rp is a resistance value of the thermistor when a temperature is a preset threshold and is maintained to be constant, and a resistance value of the third resistor R3 is equal to a resistance value of the fourth resistor R4.

When the resistance value of the thermistor Rm is lower than the resistance value of the reference resistor Rp (that is, when the ambient temperature of the light emitting element is lower than the preset threshold), in other words, a voltage drop of the thermistor is less than a voltage drop of the reference resistor Rp, a voltage of the fourth resistor R4 is greater than a voltage of the third resistor R3, that is, a voltage at the input end "+" of the comparator A is less than a voltage at the input end "−" of the comparator A. In this case, the comparator A outputs a low level signal to gate the first switch element T1, and then a voltage applied to the light emitting element is V1.

When the resistance value of the thermistor Rm is higher than the resistance value of the reference resistor Rp (that is, when the ambient temperature of the light emitting element is higher than the preset threshold), in other words, the voltage drop of the thermistor is greater than the voltage drop of the reference resistor Rp, the voltage of the fourth resistor R4 is less than the voltage of the third resistor R3, that is, the voltage at the input end "+" of the comparator A is greater than the voltage at the input end "−" of the comparator A. In this case, the comparator A outputs a high level signal to gate the second switch element T2, and then the voltage applied to the light emitting element is approximately equal to $V1 \times R2/(R1+R2)$.

For example, V1 output by the voltage supply 10 is 3.3V, and when a temperature of the light emitting element LED rises from a room temperature of, for example, 25° C. to a predetermined operating temperature of, for example, 85° C., in order to ensure constant driving current to maintain constant brightness, according to the temperature characteristic for the volt-ampere characteristic of the LED, at the operating temperature of 85° C., it needs to drive the light emitting element LED at a driving voltage of 2.8V. For this, for example, R1 may be set to 50Ω and R2 may be set to 280Ω. When the temperature of the light emitting element LED rises to, for example, 85° C., that is, when the ambient temperature of the light emitting element LED rises to, for example, 80° C., the voltage applied to the light emitting element is approximately equal to $3.3V \times 280\Omega/(50\Omega+280\Omega)$ =2.8V.

For example, in a case that the light emitting element is two (2-channel) LED strings which are connected in parallel, each LED string being five LEDs which are connected in series, when the LED is powered with 20 mA, the power consumption is 5×3.3V×20 mA×2=660 mW in a case of 3.3V and is 5×2.8V×20 mA×2=560 mW in a case of 2.8V. Thus, it can be seen from calculation that 17% of the power consumption can be saved.

According to the temperature-voltage-current (T-V-I) characteristic of the LED, while ensuring the driving current of the light emitting element to maintain the brightness, the backlight driving circuit according to the embodiments of the present disclosure reduces the driving voltage in a case that the temperature of the light emitting element rises to a predetermined operating temperature, thereby reducing the power consumption of the LED backlight.

Exemplary embodiments according to the present disclosure have been described above with reference to the accompanying drawings, but are merely exemplary and illustrative description for the purpose of illustrating and explaining the inventive concept, instead of limiting aspects of the present disclosure. It will be understood by those skilled in the art that various modifications and variations can be made without departing from the spirit and essence of the present disclosure, which fall within the protection scope of the present disclosure.

What is claimed is:

1. A backlight driving circuit, comprising:
   a voltage supply configured to supply a first driving voltage; and
   a voltage regulator configured to receive the first driving voltage supplied by the voltage supply, output the first driving voltage to a light emitting element when an ambient temperature of the light emitting element is lower than a preset threshold, and output a second driving voltage less than the first driving voltage to the light emitting element when the ambient temperature of the light emitting element is higher than the preset threshold,
   wherein the voltage regulator comprises a control unit and an output unit, the control unit is configured to control an output of the output unit according to the ambient temperature of the light emitting element,
   the control unit comprises a reference resistor, a thermistor and a comparator, wherein the thermistor has one end connected to the voltage supply and the other end connected to one input end of the comparator, the reference resistor has one end connected to the voltage supply and the other end connected to the other input end of the comparator, the comparator has an output end connected to the output unit, and a resistance value of the reference resistor is a resistance value of the thermistor when the ambient temperature of the light emitting element is the preset threshold, and
   the output unit is configured to output the first driving voltage or the second driving voltage under the control of the control unit,
   wherein the output unit comprises a first output module and a second output module, the first output module comprises a first switch element, and the second output module comprises a first resistor and a second resistor which are connected in series and a second switch element,
   the first switch element has an emitter connected to the voltage supply and one end of the first resistor, a collector connected to the light emitting element, and a base connected to the output end of the comparator, and
   the second switch element has a collector connected to the other end of the first resistor and one end of the second resistor R2, an emitter connected to the light emitting element, and a base connected to the output end of the comparator.

2. The backlight driving circuit according to claim 1, wherein
   the first output module is configured to output the first driving voltage when the ambient temperature of the light emitting element is lower than the preset threshold, and
   the second output module is configured to output the second driving voltage when the ambient temperature of the light emitting element is higher than the preset threshold.

3. The backlight driving circuit according to claim 2, wherein
   the control unit comprises a temperature detection module and a comparison module, wherein the temperature detection module is configured to detect the ambient temperature of the light emitting element and input the detected temperature into the comparison module, and the comparison module is configured to compare the detected temperature with the preset threshold, select the first output module to output the first driving voltage when the detected temperature is lower than the preset threshold, and select the second output module to output the second driving voltage when the detected temperature is higher than the preset threshold.

4. The backlight driving circuit according to claim 1, wherein in a case that the thermistor is a positive temperature coefficient thermistor, the first output module is selected by an output signal from the comparator to output the first driving voltage when the resistance value of the thermistor is lower than the resistance value of the reference resistor, and the second output module is selected by the output signal from the comparator to output the second driving voltage when the resistance value of the thermistor is higher than the resistance value of the reference resistor.

5. The backlight driving circuit according to claim 4, wherein in a case that the thermistor is a negative temperature coefficient thermistor, the first output module is selected by the output signal from the comparator to output the first driving voltage when the resistance value of the thermistor is higher than the resistance value of the reference resistor, and the second output module is selected by the output signal from the comparator to output the second driving voltage when the resistance value of the thermistor is lower than the resistance value of the reference resistor.

6. The backlight driving circuit according to claim 1, wherein the second output module constitutes a voltage dividing circuit of the first output module.

7. A backlight apparatus, comprising:
the backlight driving circuit according to claim 1; and
a light emitting element.

8. The backlight apparatus according to claim 7, wherein
the first output module is configured to output the first driving voltage when the ambient temperature of the light emitting element is lower than the preset threshold, and the second output module is configured to output the second driving voltage when the ambient temperature of the light emitting element is higher than the preset threshold.

9. The backlight apparatus according to claim 8, wherein
the control unit comprises a temperature detection module and a comparison module, wherein the temperature detection module is configured to detect the ambient temperature of the light emitting element and input the detected temperature into the comparison module, and the comparison module is configured to compare the detected temperature with the preset threshold, select the first output module to output the first driving voltage when the detected temperature is lower than the preset threshold, and select the second output module to output the second driving voltage when the detected temperature is higher than the preset threshold.

10. The backlight apparatus according to claim 8, wherein in a case that the thermistor is a positive temperature coefficient thermistor, the first output module is selected by an output signal from the comparator to output the first driving voltage when the resistance value of the thermistor is lower than the resistance value of the reference resistor, and the second output module is selected by the output signal from the comparator to output the second driving voltage when the resistance value of the thermistor is higher than the resistance value of the reference resistor.

11. The backlight apparatus according to claim 10, wherein in a case that the thermistor is a negative temperature coefficient thermistor, the first output module is selected by the output signal from the comparator to output the first driving voltage when the resistance value of the thermistor is higher than the resistance value of the reference resistor, and the second output module is selected by the output signal from the comparator to output the second driving voltage when the resistance value of the thermistor is lower than the resistance value of the reference resistor.

12. The backlight apparatus according to claim 7, wherein
the second output module constitutes a voltage dividing circuit of the first output module.

* * * * *